United States Patent [19]

Rhodes

[11] Patent Number: 4,760,816

[45] Date of Patent: Aug. 2, 1988

[54] KITTY LITTER

[76] Inventor: Andrew Rhodes, 51 Watson Ave., Ossining, N.Y. 10562

[21] Appl. No.: 855,478

[22] Filed: Apr. 24, 1986

[51] Int. Cl.$^4$ ............................................. A1K 23/00
[52] U.S. Cl. ......................................................... 119/1
[58] Field of Search ................................. 119/1; 220/6

[56] References Cited

U.S. PATENT DOCUMENTS

| | | | |
|---|---|---|---|
| 2,432,025 | 12/1947 | Lorenz | 220/6 |
| 2,720,998 | 10/1955 | Potter | 220/6 |
| 3,353,700 | 11/1967 | Kaling | 220/6 |
| 3,840,135 | 10/1974 | Bridge | 220/6 |
| 4,029,048 | 6/1977 | Gushbein | 119/1 |
| 4,036,361 | 2/1977 | Jacobson et al. | 220/6 |
| 4,348,982 | 9/1982 | Selby | 119/1 |
| 4,548,160 | 10/1985 | Feitelson | 119/1 |

*Primary Examiner*—Carl D. Friedman
*Assistant Examiner*—Caroline D. Dennison
*Attorney, Agent, or Firm*—Howard C. Miskin

[57] ABSTRACT

An animal litter box includes a stiff rectangular open ended tubular support shell and a disposable litter containing, longitudinally collapsible expandable rectangular chamber member with accordian pleated peripheral walls and rectangular stiff front and rear walls, the rear wall having a filter covered opening and the front wall having an animal access opening and a hinged cover member swingable between a ramp defining open position and a closed position covering the access opening. In assembled condition the chamber telescopes the shell, the border of the chamber rear end wall abuts the rear edge of the shell, and the chamber front wall registers with the shell front opening and is releasably locked by swingable latches. Straps are provided to tie the chamber in its collapsed condition.

12 Claims, 4 Drawing Sheets

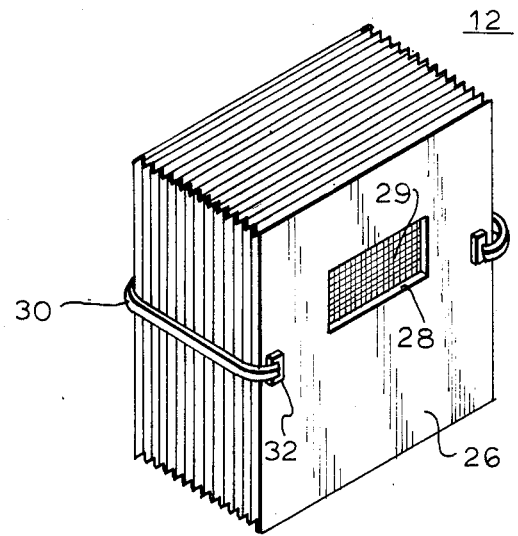
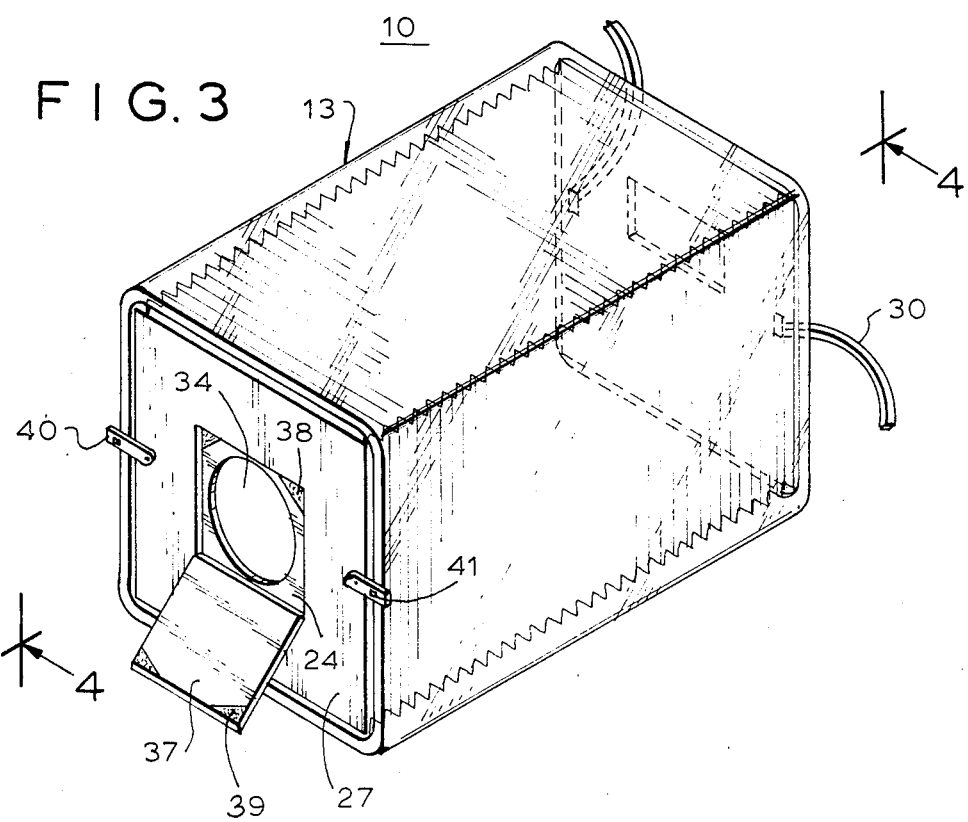

KITTY LITTER

BACKGROUND OF THE INVENTION

The present invention relates generally to improvements in animal sanitation and it relates particularly to an improved device for the dispensing, application and disposal of cat litter.

In the keeping, handling and maintenance of household pets, particularly cats, whether kittens or adults, a long standing problem has been the confinement, handling, and disposition of animal excrement. It is conventional and a common practice to provide a sanitary pan or litter box in a convenient area and line the pan with a particulate or granular litter material and train the animal to drop or deposit its excrement in the litter box. However, this practice is awkward, time consuming and generally onerous. It is necessary to periodically replace the litter and dispose the spent litter and to frequently scoop out solid excrement and dispose of it. Moreover, even when treated litter or deodorants are employed undesirable odors are present and often pervasive. It is accordingly clear that the conventional procedures for handling and dealing with the excrement of household pets such as cats leave much to be desired.

SUMMARY OF THE INVENTION

It is a principal object of the present invention to provide an improved animal excrement handling device.

Another object of the present invention is to provide an improved device for handling and disposing cat excrement in the household.

Still another object of the present invention is to provide an improved device for dispensing, applying and disposing cat litter.

A further object of the present invention is to provide a device of the above nature which is easy and convenient to use, is highly hygienic, rugged, of attractive appearance and of great versatility and adoptability.

The above and other objects of the present invention will become apparent from a reading of the following description taken in conjunction with the accompanying drawings.

An animal litter device in accordance with the present invention includes a collapsible expandable litter chamber including a front wall having an access opening, an opposite rear wall, a longitudinally contractible extendible peripheral wall extending between and connected to the front and rear walls, and a support member separably engaging the chamber and releasably maintaining it in its expanded condition. A layer of animal litter is disposed in the chamber and covers the bottom of the peripheral wall.

In the preferred form of the improved litter device the support member is a rectangular open ended tubular shell and the litter chamber is of rectangular transverse cross section and its end walls are rectangular and the litter chamber, in its expanded condition telescopes the support shell with the chamber rear wall abutting the shell rear edge and latch members releasably lock the chamber front wall to the support shell front edge. The chamber peripheral wall is accordian pleated and includes rectangular top, bottom and side walls. Tie members are carried by the chamber rear wall and in the chamber collapsed condition releasably engage the chamber front wall to releasable lock the chamber in collapsed condition. A cover member, in closed condition registers with the chamber access opening and is hinged along its bottom edge to a corresponding edge of the opening and is downwardly swingable to provide a ramp into the access opening. The chamber rear wall is likewise provide with an opening which is covered by a filter member.

The improved animal litter device greatly facilitates and expedites the handling and disposal of household animal pet excrement, obviates the need to handle the litter or excrement as such, is highly odor free and hygienic, of attractive appearance and of high versitility and adaptability.

BRIEF DESCRIPTION OF THE DRAWINGS

FIG. 2 is a rear perspective view of the litter chamber shown in its collapsed condition;

FIG. 3 is a front perspective view of the litter device in condition for use;

DESCRIPTION OF THE PREFERRED EMBODIMENT

Figure 1:
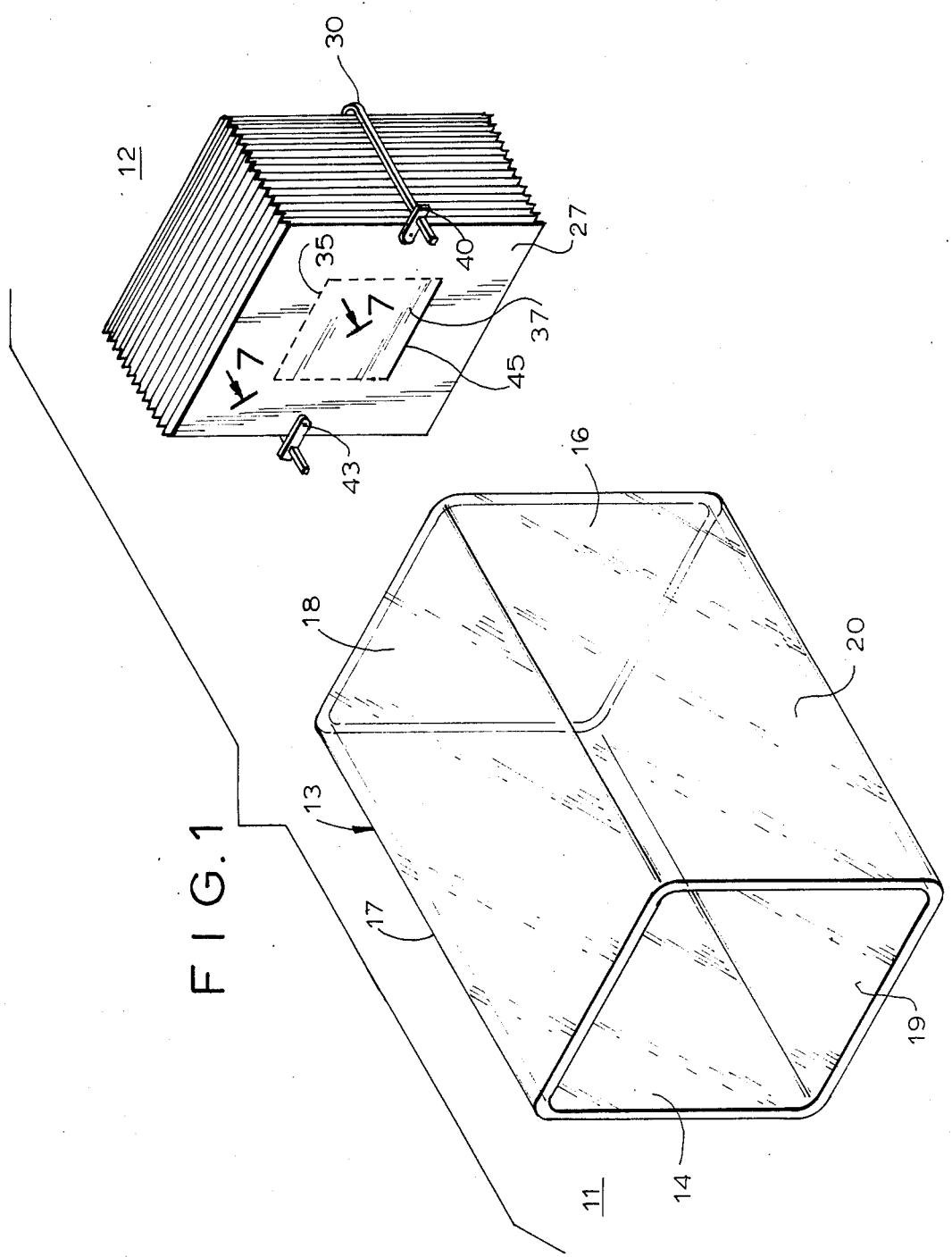
FIG. 1 is a front perspective view of the improved litter device with the litter chamber shown in its extracted collapsed condition.
Figure 4:
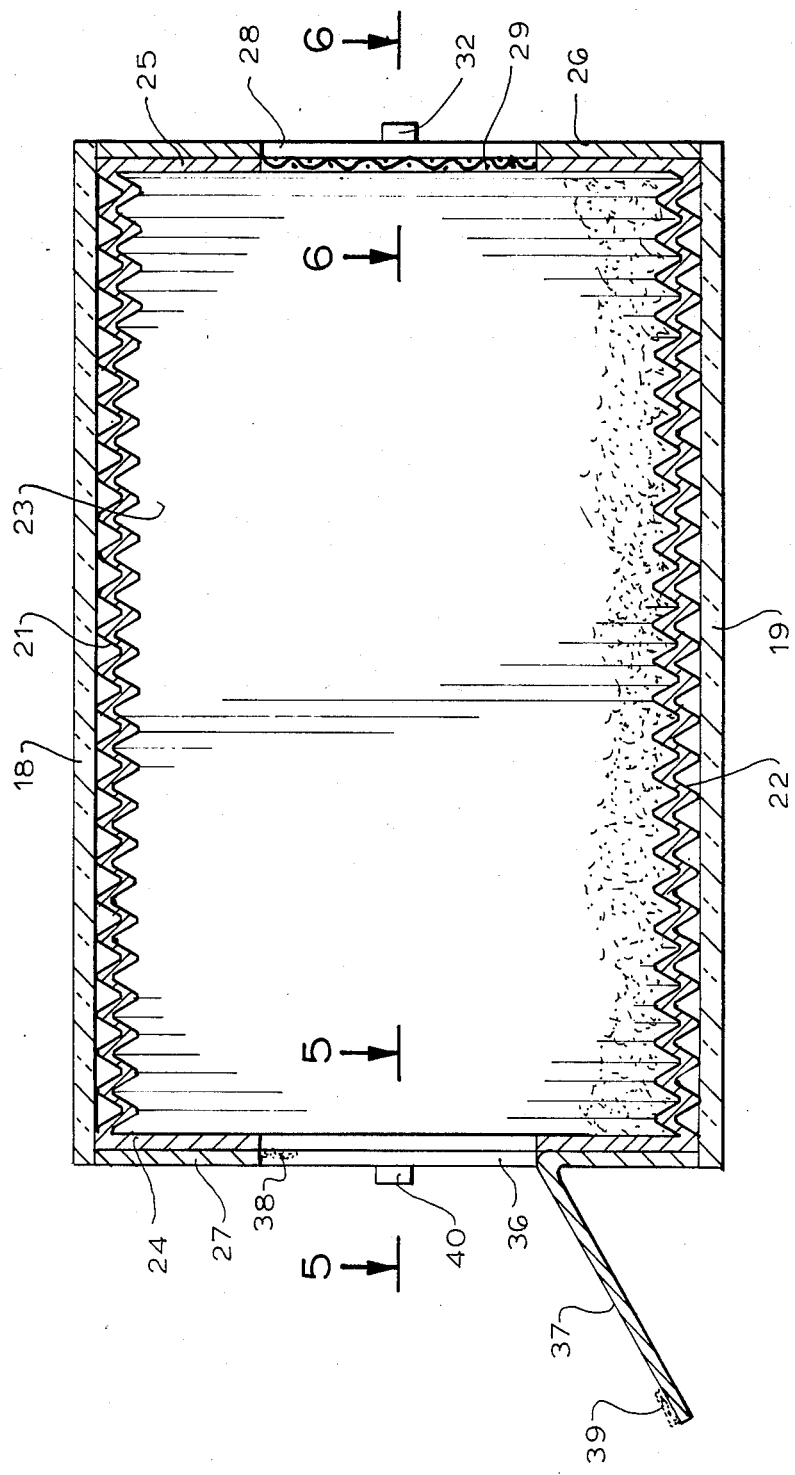
FIG. 4 is a sectional view taken along line 4—4 in FIG. 3.
Figure 5:
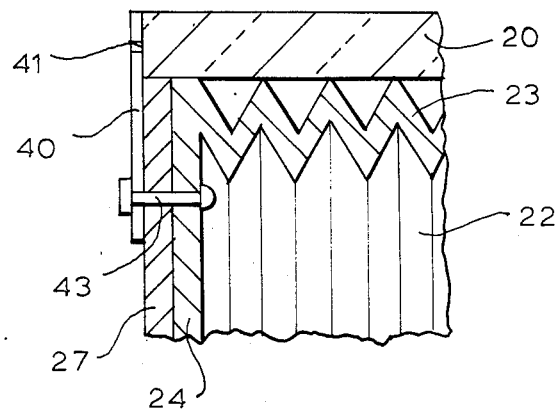
FIG. 5 is an enlarged fragmentary sectional view taken along line 5—5 in FIG. 4.
Figure 6:
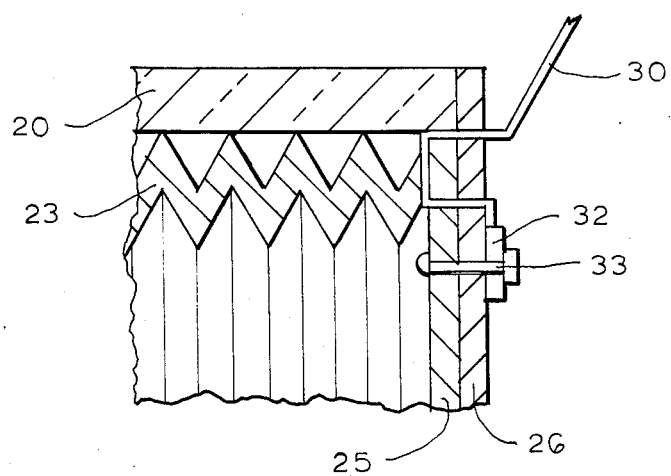
FIG. 6 is an enlarged fragmentary sectional view taken along line 6—6 in FIG. 4.
Figure 7:
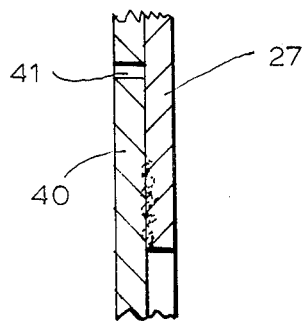
FIG. 7 is an enlarged fragmentary sectional view taken along line 7—7 in FIG. 1.

Referring now to the drawings, which illustrate a preferred embodiment of the present invention, the reference numeral 10 generally designates the improved animal litter device which comprises a retainer support member 11 and a collapsible expandable container or chamber member 12. The chamber member 12 when dispensed is in a collapsed state as shown in FIGS. 1 and 2, and is releasably locked in such collapsed state, as will be hereinafter described, and contains a sufficient amount of a particulate or granular cat litter so that when the chamber 12 is in its fully expanded condition the particulate litter forms a bottom layer therein of the desired thickness, for example, about three to five inches.

The support member 11 comprises a longitudinally extending hollow tubular shell 13 open at its front and rear ends 14 and 16 respectively and being of any desirable transverse configuration matching the outer periphery of the expended chamber 12. Shell 13 is advantageously of rectangular, preferably square transverse cross section as illustrated, with rounded longitudinal edges 17, with top and bottom walls 18 and 19 respectively and side walls 20. The support member 11 is formed of any suitable preferably stiff material, such as wood, fiber board, metal or plastic and may be decorated as desired.

Chamber member 12 is of a configuration in its expanded condition to slidably telescope and extend the length of support member 11 and it includes peripheral longitudinally extending longitudinally contractible extendible rectangular top, bottom and side peripheral walls 21, 22 and 23 respectively and square front and rear end walls 24 and 25. Each of the peripheral walls 21, 22 and 23 is longitudinally accordian pleated as shown, to permit their longitudinal contraction and expansion and are formed, with end walls 24 and 25 of any suitable flexible material of sufficient strength, for example, heavy paper which may be filament or yarn reinforced and, coated with a suitable corrosion resistant material or a thermoplastic resin such as polyethylene or the like.

Cemented, glued or otherwise secured to the rear end wall 25 is a chamber rear wall defining rectangular stiff rear panel 26 having a perimeter corresponding to the outside perimeter of shell 13. Likewise secured to the front end wall 24 is a chamber front wall defining stiff rectangular panel 27 having a perimeter equal to or slightly less than that of the inside face of shell 13. Chamber rear end wall 25 and panel 26 have coinciding medially located square openings 28 formed therein. An air permeable screen or filter 29 registers with opening 28 and is secured to rear panel 26 and has a pore size sufficiently small to prevent the passage of litter granules.

A pair of band shaped ties or straps 30 formed of a flexible or pliable plastic or coated or sheathed metal have their respective inner ends secured to medial points on the opposite vertical borders of rear panel 26. Each tie terminates at its inner end in an enlarged head washer 32 which is affixed to the rear face of rear panel 26 by a bolt engaging rear end wall 25, panel 26 and washer 32. Each tie 30 extends from washer 32 forwardly and thence rearwardly through rear end wall 25 and panel 26.

Centrally formed in chamber front wall 24 is a circular access opening 34 of sufficient diameter to permit the free passage both into and out of the chamber 12 of an animal such as a cat. A square opening 36 of somewhat greater width than opening 34 is formed in front panel 27 concentrically with opening 34 to expose opening 34 and parts of front wall 24 at the corners of a panel opening 36.

A square cover member 37 of approximately the size of opening 36 is hinged, preferably by a self or live hinge, along its bottom edge to the bottom edge of panel opening 36 and is swingable between a closed position coinciding with and engaging opening 36 and a forwardly downwardly inclined ramp defining open position with its free edge located forwardly of and at the level of the bottom wall of shell 13 in the chamber shell assembled condition. In order to releasably retain cover member 37 in closed position pieces of Velcro separable fastener pieces 38 and 39 are secured to the front face of front wall 34 at the corners of opening 36 and complementary Velcro pieces 39 are secured to the outer corners of the inside face of cover member 37. In the closed position of cover 37 Velcro pieces 39 overlie and releasably engage Velcro pieces 38.

In the initial or dispensed condition of the chamber member 12 the cover member 17 is part of and coplanar with front panel 27 and is delineated therefrom by lines of weakness along the cover top and bottom edges and a fold line 45 along the cover's bottom edge.

A pair of latch elements 40 are each medially secured by pivot pins 43 to the side vertical borders of the front face of front panel 27 and are swingable between positions engaging the front vertical edges of shell 13 to retain the shell retained expanded chamber in its expanded condition and positions transversely inwardly of the shell side edge to permit the collapse and removal of chamber 12. A transverse slot 41 is formed in each latch element 40 proximate its outer end for engaging a respective strap 30 and permit the locking of the chamber 12 in its collapsed condition as shown in FIGS. 1 and 2.

In the operation and application of the improved litter device the chamber member 12, containing a suitable amount of litter 44, sufficient to form a layer thereof the desired depth in the expanded chamber is stored and dispensed in its collapsed condition in which condition it is releasably retained by engaging straps 30 with the slots 41 of respective latch elements 40 and securing the straps to the latch elements. Support member 11 is located in the desired area. The cover 37 is formed by severing the lines of weakness 35 in front panel 27, and the chamber is longitudinally expended by pulling the chamber end walls apart to extend the chamber accordian pleated peripheral walls. Air is sucked into the chamber through filter 29 during the chamber expansion and the contained litter is spread as a layer on the chamber bottom wall 22. The expanded chamber 12 is then telescopically inserted into shell 13 until the border of rear panel 26 engages the rear edge of shell 13 to prevent the further forward movement of rear panel 26 and when the front panel registers with the front opening of shell 13 latch elements 40 are swung outwardly to engage the vertical front edges of shell 13 to retain chamber member 12 in its expanded condition. The cover member 37 is then swung to its open ramp position and the litter device is ready for use.

After a suitable period of time when the litter requires replacement the cover member 37 is closed and retained in closed position by Velcro pieces 38, 39, the latch elements 40 swung to their vertical unlatch positions and the chamber 12 longitudinally collapsed, the air in the chamber emerging through filter 29. The chamber 12 is maintained in its collapsed position by interlocking straps 30 with latch slots 41 an the collapsed chamber 12 is then discarded. A fresh litter containing chamber 12 is then applied to shell 13 in the manner described above.

While there has been described and illustrated a preferred embodiment of the present invention, it is apparent that numerous alterations, omissions and additions may be made without departing from the spirit thereof.

I claim:

1. An animal litter device comprising a horizontally longitudinally collapsible expandable chamber unit containing a particulate animal litter and including opposite front and rear vertical end walls and a longitudinally contractable extendible peripheral wall extending between and joined to said end walls, said front end wall having means providing access for a cat to the interior of said chamber through said front wall; and a support member defining a separate unit separably engaging said chamber and releasably maintaining said chamber in its expanded condition.

2. The litter device of claim 1 including means for releasably locking said chamber in its collapsed condition.

3. The litter device of claim 1 wherein said access providing means is defined by an opening formed in said front end wall and a cover member movable from position closing said opening and a position exposing said opening.

4. The litter device of claim 3 wherein said cover member is hinged along a bottom edge thereof to a bottom edge of said opening and is swingable to an outwardly downwardly inclined open position to define a ramp.

5. The litter device of claim 1 wherein said chamber rear end wall has an opening therein and includes an air permeable filter registering with said rear wall opening.

6. The litter device of claim 1 wherein said chamber peripheral wall is accordian pleated.

7. The litter device of claim 1 wherein said support member comprises a tubular shell having open ends, said chamber in its expanded condition is surrounded by said shell and said chamber end walls being releasably maintained proximate respective open ends of said shell in the expanded condition of said chamber.

8. An animal litter device comprising a horizontal rectangular tubular shell defining a first unit and being open at opposite ends thereof, and a separate second unit defined by a horizontal longitudinally collapsible expandable chamber containing a particulate litter material and in its expanded condition is substantially surrounded by said shell, said chamber including rectangular front and rear end walls releasable retained in registry with said shell end openings and contractible extendible top, bottom and side walls extending between said chamber end walls, said chamber front wall having a cat access opening therein and a cover member releasably closing said access opening.

9. The litter device of claim 8 wherein said access opening is defined by horizontal top and bottom edges and vertically extending side edges extending between the ends of said top and bottom edge, said cover member in its closed condition registering with said access opening and being hinged along its bottom edge to said opening bottom edge and being initially joined along its upper edges to said opening upper edges by lines of weakness.

10. The litter device of claim 8 wherein said chamber top, bottom and side walls are accordian pleated.

11. The litter device of claim 8 wherein said rear wall has an opening formed therein and includes an air permeable filter registering with said rear wall opening.

12. The litter device of claim 8 including means attached to said chamber for releasably retaining said chamber in its collapsed condition.

* * * * *